United States Patent
Kirchberg et al.

(10) Patent No.: US 6,495,984 B2
(45) Date of Patent: Dec. 17, 2002

(54) STEP CONTROLLER

(75) Inventors: Karl-Heinz Kirchberg, Karlsruhe (DE); Dieter Mohr, Gondelsheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/931,865

(22) Filed: Aug. 20, 2001

(65) Prior Publication Data
US 2002/0043952 A1 Apr. 18, 2002

Related U.S. Application Data

(63) Continuation of application No. PCT/DE00/00466, filed on Feb. 18, 2000.

(30) Foreign Application Priority Data

Feb. 19, 1999 (DE) ..................................... 299 03 016 U

(51) Int. Cl.$^7$ ............................................... G05B 11/42
(52) U.S. Cl. ........................ 318/610; 318/609; 318/611
(58) Field of Search .................................. 318/610, 609, 318/611; 388/906, 903; 700/45, 42

(56) References Cited

U.S. PATENT DOCUMENTS

| | | | | |
|---|---|---|---|---|
| 5,384,526 A | | 1/1995 | Bennett | 318/610 |
| 6,081,751 A | * | 6/2000 | Luo et al. | 700/42 |
| 6,094,602 A | * | 7/2000 | Schade, III | 700/45 |

FOREIGN PATENT DOCUMENTS

| | | | | |
|---|---|---|---|---|
| DE | 36 34 050 | | 2/1988 | G05B/11/18 |
| DE | 40 04 183 | | 8/1991 | G05B/11/42 |
| DE | 44 34 703 | | 4/1996 | G05B/11/42 |
| EP | 0 299 321 | | 1/1989 | G05B/11/42 |

* cited by examiner

Primary Examiner—Karen Masih
(74) Attorney, Agent, or Firm—Sughrue Mion, PLLC

(57) ABSTRACT

The present a step controller includes a switching circuit having at least two outputting states, especially a three-level switch (DPS1) with negative feedback, and a PI or PID controller having an integrator (I1). The integrator is inactive during the positioning pulse of the three-level switch. The integrator (I1) is provided with a correcting element (CORR) which reduces the reset time (Tn) for a large input signal (xd). In this way, linear behavior of the step controller can be attained over the entire positioning range of a positioning element.

5 Claims, 2 Drawing Sheets

STEP CONTROLLER

This is a continuation of International Application PCT/DE00/00466, with an international filing date of Feb. 18, 2000, which was published under PCT Article 21(2) in German.

BACKGROUND OF THE INVENTION

1. Field of the Invention

The present invention relates in general to a step controller, and more particularly to a correcting element of a step controller that reduces a reset time of the step controller as a function of an input signal.

2. Description of the Related Art

A conventional step controller is disclosed by German Patent DE 40 04 183 A1. This step controller has a three-level switch with an operating threshold and with hysteresis. The step controller also has a negative feedback through a feedback element containing an integrator. To achieve PI (proportional-integral) action by the controller, an error signal, used as the input signal, is multiplied by a factor Kp and fed back directly as the proportional (P) component. The input signal is also fed back through a parallel branch containing an integrator to the three-level switch. In the integrator, the input signal is integrated only during the intervals between the output signals from the three-level switch, i.e., during the pauses of the output control pulses. Thus, the linear behavior of the P component across the control range is attained in an advantageous way.

The step controller has only a slight dependence of the effective controller parameter on the controller input signal. Therefore the control parameters of the step controller can be optimized like a linear controller so that the step controller can be used as a self-adapting controller. To adapt the controller to a process, for example, a step excitation can be applied to the process and the step response of the process can be evaluated. By evaluating the process response, a suitable process model and its parameters can be calculated, and a linear controller can be determined for the parameters of the process identified in that manner to give optimum yield. In the known step controller, furthermore, a special adaptation of the operating threshold of the three-level switch can be used to reduce the frequency of switching so as to minimize wear of the positioning element. In this adaptation, the duration of the control pulse increases with the magnitude of the excitation.

Although the conventional step controller is generally thought to provide acceptable control action, it is not without shortcomings. Namely, the conventional step controller still has residual, nonlinear behavior, and therefore the controller parameters established for the controller following parameter optimization differ from the controller parameters that are finally effective on operation of the step controller. That can lead to the transient response of the controller changing with the magnitude of the excitation. Furthermore, the number of control pulses increases with increasing excitation, and that in turn increases the wear of the positioning element again.

SUMMARY OF THE INVENTION

An object of the present invention is to provide a step controller in which the control action can be further improved.

The present step controller improves the approximation of the controller behavior to that of a linear controller by use of a correcting element which reduces the controller reset time as a function of the error signal used as the input signal, so that the reset time is shorter for a larger input signal.

The present invention is based on the recognition that the effective reset time for the known step controller increases with increasing excitation. Only the controller amplification was independent of the excitation. That is, for large error signals the step controller initially behaved as a P controller. The integral (I) component became active only with diminishing error signal. The greater the excitation was, then, the more slowly it was corrected. For a controller adjustment according to the optimum process and with small changes in the set point, there was still an overshoot in the control magnitude, which decreased for larger steps in the set point. If the controller were adjusted so that large changes in the set point could be adjusted aperiodically, then the control magnitude could still overshoot with small steps in the set point. In spite of the improvements made for the linearity of the P component in the known step controller, the controller was still always nonlinear with respect to the reset time. This effect is compensated by the use of the correcting element in the present step controller.

Practically ideal linear behavior of the step controller can be attained advantageously with the correcting element of the present invention. For example, when the step controller controls a linear process, the parameters can be set so that if a sudden excitation occurs, then the control magnitude is adjusted aperiodically to a new steady final value, independent of the magnitude of the sudden excitation.

For reliability, the corrected reset time is limited to a minimum value, preferably five times the sampling time. Limitation to one-tenth of the reset time Tn is an acceptable alternative.

If the operating threshold of the three-level switch is adjusted only as a function of the proportional component of the controller, then the step controller is also advantageously well suited as a controller with proportional-integral (PI) behavior in which the reset time is very large so that the I component is practically negligible.

When the set point is constant, the operating threshold can be set advantageously to half of the magnitude of the proportional component, for example. If the set point changes, the operating threshold can be set to one twentieth of the magnitude of the proportional component, for example. That gives a good compromise between the number of switching processes and the control quality. In addition, ramp changes in set point can be followed better with such a controller.

The above and other features of the invention including various and novel details of construction will now be more particularly described with reference to the accompanying drawings and pointed out in the claims. It will be understood that the particular step controller embodying the invention is shown by way of illustration only and not as a limitation of the invention. The principles and features of this invention may be employed in varied and numerous embodiments without departing from the scope of the invention.

DETAILED DESCRIPTION OF THE PREFERRED EMBODIMENT

Figure 1:
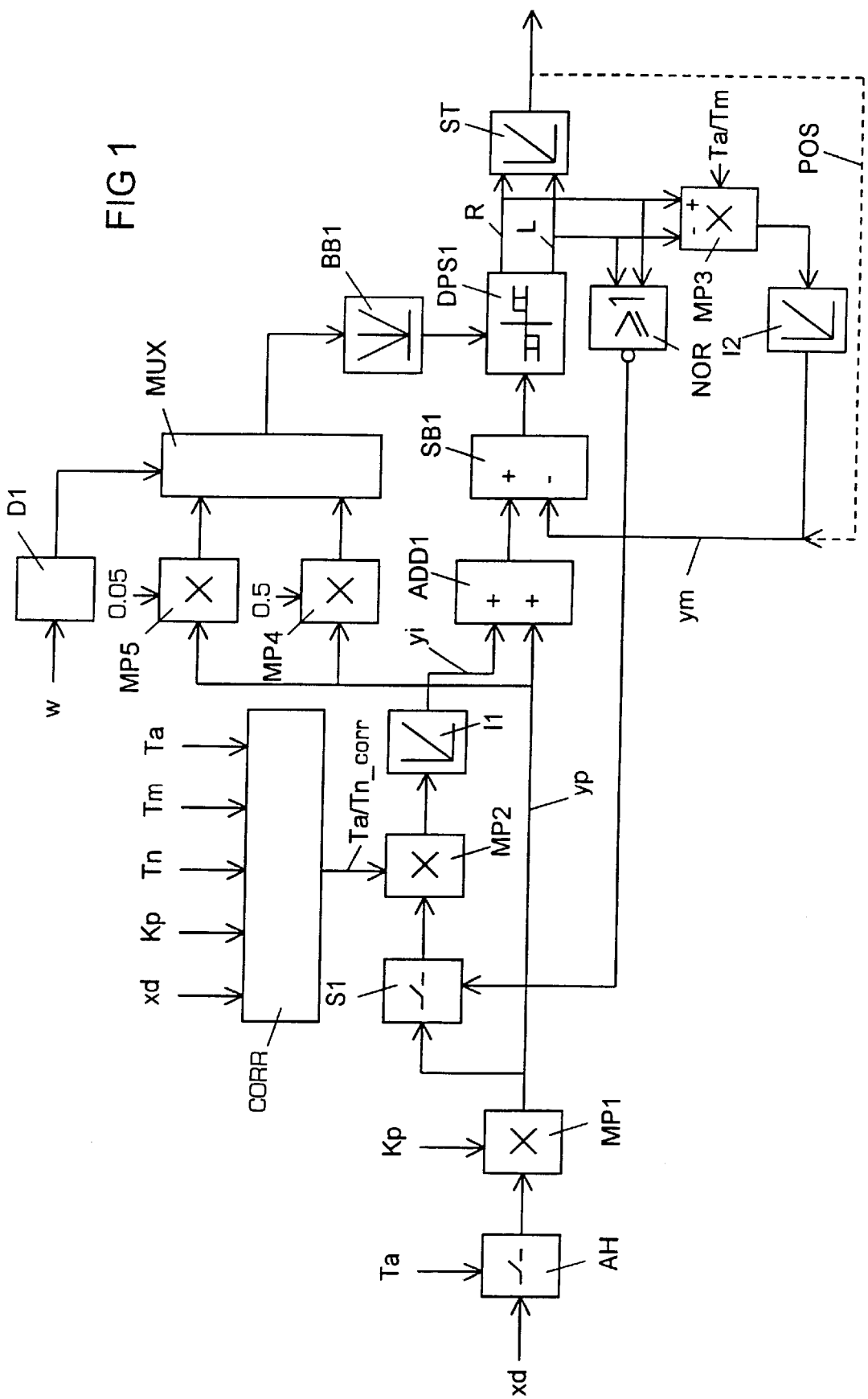
FIG. 1 is a block circuit diagram of the step controller according to one embodiment of the present invention.

In FIG. 1, AH indicates a sample-and-hold circuit which samples an error signal xd at time intervals Ta. The sampleand-hold circuit AH stores the error signals xd during the sampling time and sends them to a multiplier MP1. The multiplier MP1 multiplies the output signal from the sample-and-hold circuit AH by a controller amplification factor Kp. That produces a proportional signal yp, which is transmitted not only directly to a first input of an adder ADD1 but also through a parallel branch. The parallel branch has (1) a switch S1, (2) a second multiplier MP2 which multiplies the proportion signal yp by a ratio of the sampling time Ta to a corrected reset time Tn_corr, and (3) an integrator I1, which generates an integral component yi that is sent to a second input of the adder ADD1. From the output signal of the adder ADD1, a subtracter SB1 subtracts a signal ym, which corresponds to the position of a motor which is the positioning element ST in this embodiment. The difference signal produced by the subtracter SB1 is outputted to a three-level switch DPS1, for example.

The three-level switch DPS1 has two pairs of switching points, each with a switch-on point determined by an operating threshold and a switch-off point determined by a switch-off threshold. The difference between the operating threshold and the switch-off threshold is called the hysteresis. The output signal from the three-level switch DPS1 has three possible states. In this embodiment, the three-level switch DPS1 has two "on" states, one for the motor running clockwise and one for the motor running counterclockwise, and one "off" state. For clockwise rotation of the motor, a positioning signal is output on line R, and for counterclockwise rotation, a positioning signal is output on line L. In the "off" state, no positioning signal is produced. The lines R and L lead to a motor which is the positioning element ST, which has integrating action. In another embodiment, heater control for example, the switch DPS1 would be replaced by a two-level switch and the positioning element ST would be replaced by a heater. The present invention is also applicable to a mixing controller.

A NOR element NOR is connected to the two lines R and L. The NOR element controls the switch S1, so that the switch S1 is closed if no positioning signal is output on either of the two lines R and L. Therefore the integrator I1 is active only during the times in which no positioning pulse is output.

The signal ym at the subtracting input of the subtracter SB1 corresponds to the position of the positioning element ST. In the simplest case, a position transducer is connected to the positioning element ST. The position transducer transmits a signal over the line POS, shown in phantom. In the example embodiment, in which no such position transducer is present, the position of the positioning element ST (or motor) is emulated by multiplying the momentary signal on lines R and L by the ratio of the sampling time Ta to a positioning time Tm of the positioning element ST. This product is integrated by an integrator I2, the time constant of which corresponds to the positioning speed of the positioning element ST. The positioning time Tm of the positioning element ST is the time required for the positioning element to move from one end position to the other. The ratio $$(Ta/Tm)*100\%$$

thus corresponds to the positioning distance through which the positioning element ST moves in a sampling period Ta. In this way, the positioning distance from stop to stop is normalized to 100%.

Together with the feedback through the integrator I2 and the multiplier MP3, or by means of the line POS, the three-level switch DPS1 forms a proportional controller, because when there is a step change of the signal at the summing input of the subtracter SB1, the positioning element ST is moved to an extent proportional to that change.

A correcting element CORR functions to correct the reset time. The correcting element CORR determines a corrected reset time Tn_corr as a function of the controller input xd, the amplification factor Kp, the desired reset time Tn, the positioning time Tm, and the sampling time Ta. The correcting element CORR then outputs the ratio of the desired sampling time Ta to the corrected reset time Tn_corr to the multiplier MP2. The corrected reset time Tn_corr is calculated from the formula:

$$Tn\_corr = Tn - abs(0.01 * Kp * xd * Tm).$$

The function abs takes the absolute value of the equation set forth in parentheses.

The three-level switch DPS1 is operated with a variable operating threshold. If the set point w is constant, the operating threshold is set to half the magnitude of the proportional component yp by a multiplier MP4 and an absolute value generator BB1. If the set point w changes, then the operating threshold is set to one twentieth of the proportional component yp by a multiplier MP5 and the absolute value generator BB1. A change detector D1 is provided to detect whether there is a change in the set point w. The change detector D1 controls a multiplexer MUX in a corresponding manner.

Figure 2:
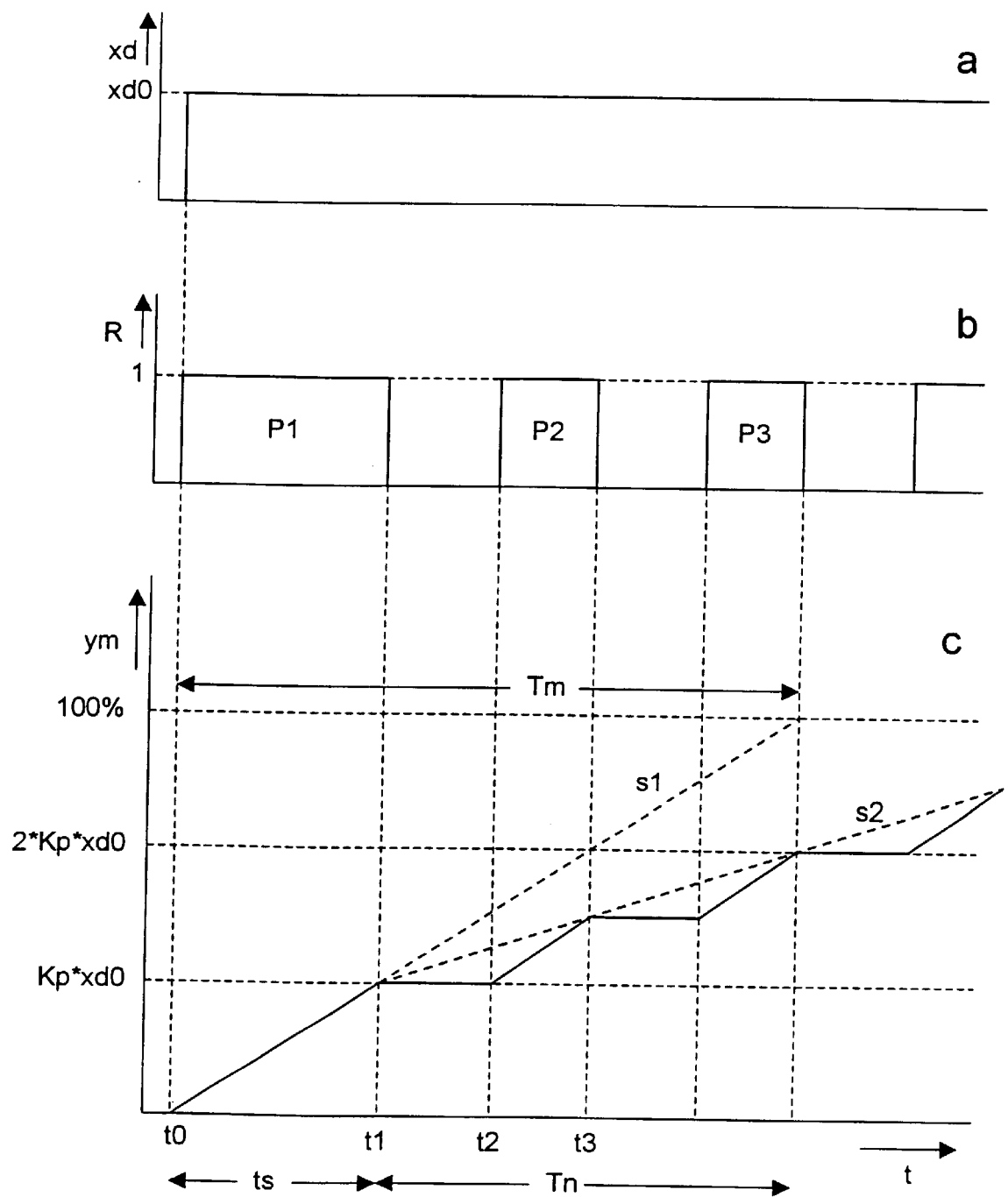
FIG. 2 is a timeline showing exemplary controller responses.

The operation of the step controller as shown in FIG. 1, and, in particular, the importance of the correcting element CORR are explained below with reference to FIG. 2. First consider the courses of the signals as they would occur if the correcting element CORR were omitted and the ratio of the sampling time Ta to the reset time Tn were connected directly to the multiplier MP2. At time t0, a step xd in the input signal to a value xd0 excites the step controller out of its steady state (see Diagram a). The step response of the step controller is taken into consideration. Accordingly, the signal at the summing input of the subtracter SB1 and, initially, also the input signal of the three-level switch DPS1 has the value Kp*xd0. The operating threshold of the three-level switch DPS1 is exceeded and the switch DPS1 outputs a first pulse P1 as a positioning signal to the line R (Diagram b). The positioning element ST is operated at a constant speed. Thus the signal ym corresponding to the position of the positioning element ST increases linearly until at time t1.

At time t1, the output signal from the subtracter SB1 becomes smaller than the switch-off threshold of the three-level switch DPS1, and therefore the positioning pulse P1 is terminated. For clarity, the switch-off threshold is not shown in FIG. 2. Because of the constant positioning speed of the positioning element ST, the duration of the first positioning pulse P1 and thus the positioning movement are proportional to the magnitude of the input signal change xd0. Thus the controller has proportional action up to time t1.

At the end of the first pulse P1, the switch S1 is closed. The input signal xd0 multiplied by the factor (Kp)*(Ta/Tn_corr) is integrated and the output signal from the integrator I1 is added to the proportional component yp=Kp*xd0. If the correcting element CORR is omitted, then Tn_corr is equivalent to the reset time Tn obtained with a controller design process. Thus, the summation signal at the output of the adder ADD1 increases slowly until, at time t2, the difference at the output of the subtracter SB1 reaches the operating threshold of the three-level switch DPS1 and a second positioning pulse P2 is produced.

At time t2, the switch S1 is opened and the integral component yi remains constant while the feedback signal ym increases as the position of the positioning element ST changes. When the difference signal at the input of the three-level switch DPS1 decreases below the switch-off threshold, the positioning pulse P2 is terminated at time t3.

At time t3, the switch S1 is closed and the integration is continued until the operating threshold of the three-level switch DPS1 is again exceeded and the next positioning pulse P3 is produced. This operation repeats as long as the value xd0 is applied as excitation to the controller.

From the course of the motor position signal ym (solid line in diagram c), a straight line (shown in phantom) can be established with an initial slope s1 for the motor position during the initial positioning pulse, and a straight line (shown in phantom) with a slope s2 for the motor position can be established by means of the subsequent positioning pulses.

The following auxiliary quantities are introduced in the calculations below to abbreviate the notation:

$ts = t1 - t0 =$ duration of the first switch-on pulse $P1$;

$tp = t2 - t1 =$ "off" duration between two successive pulses; and $te = t3 - t2 =$ "on" duration of the successive pulses $P2, P3, \cdots$ An effective controller amplification in the step controller, Kp_eff, can be determined from the initial slope s1:

$$s1 = (Kp\_eff * xd)/ts$$
$$= 100\%/Tm.$$

After a transformation, Kp_eff is solved for as follows:

$$Kp\_eff=(100\%/xd)*(ts/Tm).$$

And an effective reset time in the step controller, Tn_eff, can be determined from the slope s2. Then:

$$s2 = ((te/Tm)*100\%)/(te+tp)$$
$$= (100\%/Tm)*(te/(te+tp))$$
$$= (100\%/Tm)*(1/(1+(tp+te))).$$

On the other hand, for a PI controller:

$$s2=(Kp\_eff*xd)/Tn\_eff.$$

The last two equations are then set to be equal to each other, as follows:

$$(Kp\_eff*xd)/Tn\_eff=(100\%/Tm)*(1/(1+(tp/te))).$$

This equation is solved for Tn_eff, as follows:

$$Tn\_eff=((Kp\_eff*xd)/100\%)*Tm*(1+(tp/te)).$$

Then, at the three-level switch DPS1, either a successive pulse is started, or the output of a pulse is terminated, if the input signal of the three-level switch DPS1 changes by the amount of a hysteresis Xh. In order for that to occur, either the integral component yi from the integrator I1 or the position signal ym from the positioning element ST must have changed by the magnitude Xh. Therefore, the ratio of the pause duration tp to the switched-on time te can be determined as follows:

$$Xh = (te/Tm)*100\%$$
$$= (tp/Tn)*Kp*xd.$$

The hysteresis Xh corresponds to the difference between the switch-on and switch-off thresholds of the three-level switch DPS1. This equation can be transformed to:

$$tp/te=(100\%/(Kp*xd))*(Tn/Tm).$$

Accordingly, the effective reset time Tn_eff can be calculated as:

$$Tn\_eff=((Kp\_eff*xd)/100\%)*Tm*(1+(100\%/(Kp*xd))*(Tn/Tm)).$$

And since the effective controller amplification Kp_eff is equivalent to the set value Kp due to the structure of the step controller, this equation can be further simplified to:

$$Tn\_eff=Tn+((Kp*xd)/100\%)*Tm.$$

It is clear from this equation that the effective reset time Tn_eff increases linearly with the error signal xd. That is because of the special design of the step regulator. Namely, the integrator I1 is active only during the pauses between positioning pulses. That is, the integration is stopped while positioning pulses are being outputted. Therefore the error signal is not integrated further during the output of the positioning pulses. Positioning power is lost during these periods. In addition, the adaptation algorithm for the switch-on threshold provides for extending the duration of the pulse as the magnitude of the error signal increases.

The more positioning pulses are generated and the longer those pulses last, the weaker the integral component of the controller becomes. This relationship is used in the correcting element CORR to correct the predetermined reset time Tn of the controller. The corrected reset time Tn_corr is calculated as:

$$Tn\_corr=Tn-abs(0.01*Kp*xd*Tm).$$

Therefore the corrected reset time set for the controller is reduced as a function of the error signal xd, so that the integration during the pauses between pulses becomes stronger. That compensates for the loss caused by the lack of integration during pulse output.

The reset time should not be reduced arbitrarily, though. In the sampling control shown as an example embodiment, the lower limit of the corrected reset time Tn_corr is preferably five times the sampling time Ta. That is, if the corrected reset time Tn_corr is calculated as less than five times the sampling time Ta, the correcting element CORR establishes it as Tn_corr=5*Ta.

The nature of the adaptation used for the operating threshold in the three-level switch DPS1 has the advantage that it is also possible to produce step controllers with structures parameterized as P or PD (proportional-derivative) controllers. This case occurs if the parallel branch is completely disconnected by the switch S1 (see FIG. 1). For example, level or fill controllers contain integrating components in the behavior of the process. Therefore, controllers with pure P or PD structure are well suited for such control applications. The step controllers according to the present invention can also be used for these control applications by means of the adaptation used for the operating threshold. Also, because of the adaptation mechanisms used, ramp changes of the set point w can also be followed with good accuracy.

For temperature control of extruders or tempering machines, as an example, the parameters of a PID controller are frequently designed to behave well in the presence of noise. To do so, they are adjusted more sharply; that is, the reset time Tn is reduced. So that steps in the set point do not cause large overshoots, the P or PD component of the controller is placed in the feedback link. Such a structure is also possible with the present controller. Separation of the controller structure into a branch to produce a proportional component and a branch to produce an integral component is not absolutely essential. It is important, though, that it be possible to cut off the integration while positioning pulses are being outputted.

What is claimed is:

1. A step controller, comprising:
   a switching circuit that outputs a positioning pulse in response to a switch reaching an operating threshold, the switch having hysteresis and at least two outputting states, the switching circuit having a negative feedback link; and
   one of a PI controller and a PID controller having an integrator (I1) that produces an integral component (yi), with the integration function of the integrator being interrupted during the output of the positioning pulse,
   wherein the integrator (I1) is provided with a correcting element (CORR) that reduces a reset time (Tn) of the controller as a function of an input signal (xd) to determine a corrected reset time (Tn_corr), the corrected reset time (Tn_corr) being made shorter as the strength of the input signal increases.

2. The step controller according to claim 1, wherein the correcting element (CORR) determines the corrected reset time (Tn_corr) of the integrator (I1) according to the following equation:

$$Tn\_corr = Tn - abs(0.01 * Kp * xd * Tm),$$

with
   xd—input signal of the controller,
   Tm—running time for a positioning element (ST) controlled by the switch (DPS1) to move through a positioning range, and
   Kp, Tn—at least approximations of a parameter amplification and a reset time, respectively, for a linear controller optimized for aperiodic control of a process to be controlled.

3. The step controller according to claim 2, wherein in sampling control with a sampling time Ta, the corrected reset time Tn_corr has a lower limit of one of five times the sampling time Ta and one tenth of the rest time Tn.

4. The step controller according to claim 1, wherein the operating threshold of the switch is adjusted only as a function of a proportional component (yp) input to the controller.

5. The step controller according to claim 4, wherein if a set point (w) is constant, the operating threshold of the switch is set to half of the absolute magnitude of the proportional component; and if the set point (w) varies, the operating threshold of the switch is set to one twentieth of the absolute magnitude of the proportional component (yp).

* * * * *